US005322671A

United States Patent [19]

Shustorovich et al.

[11] Patent Number: 5,322,671

[45] Date of Patent: Jun. 21, 1994

[54] CATALYTIC VESSEL

[75] Inventors: Eugene Shustorovich, Pittsford, N.Y.; Richard Montano, Vienna, Va.; Veniamin Kalner, Moscow, U.S.S.R.; Aleksandr Bragin, Moscow, U.S.S.R.; Nikolai Moiseev, Moscow, U.S.S.R.; Konstantin Solntsev, Moscow, U.S.S.R.; Yuri Buslayev, Moscow, U.S.S.R.

[73] Assignee: Blue Planet Technologies Co., L.P., New York, N.Y.

[21] Appl. No.: 840,860

[22] Filed: Feb. 25, 1992

[51] Int. Cl.[5] ........................ F01N 3/08; B01J 8/08

[52] U.S. Cl. ........................ 422/176; 55/523; 55/524; 55/525; 60/295; 60/299; 422/177; 422/211; 422/213

[58] Field of Search ............... 422/119, 211, 171, 172, 422/176-177, 211, 213, 220, 222; 55/523-528; 29/890; 60/295, 273, 282, 299

[56] References Cited

U.S. PATENT DOCUMENTS 1,989,113 1/1935 Rector .
2,086,775 7/1937 Lyons et al. .
2,151,432 3/1939 Lyons et al. .
2,194,186 3/1940 Pier et al. .
2,800,172 7/1957 Romer et al. .
3,348,932 10/1967 Kukin .
3,450,116 6/1969 Knight et al. .
3,537,434 11/1970 Herpin .
3,716,040 2/1973 Herpin ........................ 123/198 A
3,746,498 7/1973 Stengel ........................ 431/4
3,773,894 11/1973 Bernstein et al. .
3,800,532 4/1974 Schischkow ........................ 60/274
3,856,901 12/1974 Neumann et al. ................ 261/18 A
3,862,819 1/1975 Wentworth, Jr. ................ 431/4
3,875,922 4/1975 Kirmss ........................ 123/198 A
3,910,850 10/1975 Turner ........................ 422/177
3,929,118 12/1975 Leong ........................ 123/198 A
3,953,369 4/1976 Ohara et al. ........................ 425/472
3,959,183 5/1976 Gospodar ........................ 252/477 R
3,978,193 8/1976 Fedor et al. ........................ 422/177 X
3,979,185 9/1976 Stevenson ........................ 422/171
4,016,837 4/1977 Wentworth, Jr. ................ 123/25 R
4,024,079 5/1977 Okuyama et al. ............. 252/455 R
4,048,098 9/1977 Koberstein et al. ............... 252/432
4,064,037 12/1977 Graven et al. ..................... 208/120
4,064,039 12/1977 Penick ........................ 208/160
4,090,838 5/1978 Schena et al. ..................... 431/4
4,118,199 10/1978 Volker et al. ..................... 422/171
4,118,339 10/1978 Latos ........................ 252/47
4,170,960 10/1979 Germack et al. ............... 123/198 A
4,188,309 2/1980 Völker et al. ................... 252/466 J
4,197,272 4/1980 Tighe ........................ 422/177
4,214,615 7/1980 Boyer ........................ 141/363
4,218,422 8/1980 Schock et al. ..................... 422/171
4,255,173 3/1981 Mayer et al. ..................... 55/329
4,295,816 10/1981 Robinson ........................ 431/4
4,362,130 12/1982 Robinson .
4,382,017 5/1983 Robinson et al. ............... 252/429 R
4,397,772 8/1983 Noakes et al. ..................... 422/177
4,410,467 10/1983 Wentworth, Jr. ................ 261/18 A
4,419,967 12/1983 Protacio et al. .
4,425,305 1/1984 Kawata et al. ..................... 422/171
4,475,483 10/1984 Robinson .
4,476,339 10/1984 Reinhard et al. ................. 585/379
4,631,076 12/1986 Kurihara ........................ 55/283
4,646,516 3/1987 Bostock ........................ 60/295
4,665,690 5/1987 Nomoto et al. ..................... 60/286
4,752,302 6/1988 Bowers et al. ..................... 44/68
4,757,045 7/1988 Turner et al. ..................... 502/252
4,842,617 6/1989 Kukin ........................ 44/51
4,863,889 9/1989 Passaretti-Miscia ............... 502/216
4,891,050 1/1990 Bowers et al. ..................... 44/67
4,892,562 1/1990 Bowers et al. ..................... 44/67
5,094,821 3/1992 Hitachi et al. ..................... 422/180

*Primary Examiner*—Robert J. Warden
*Assistant Examiner*—Krisanne M. Thornton
*Attorney, Agent, or Firm*—Kenyon & Kenyon

[57] ABSTRACT

A catalyst vessel including an inlet at an upstream end, a plurality of catalytic chambers located downstream of the conduit, wherein at least two chambers are connected by a plate having one or more orifices therein to permit gas flow through from the first chamber to the second chamber, and wherein at least one surface in the chamber is adapted for deposition of a metal selected from the group consisting of platinum, rhodium, and rhenium, and an outlet at its downstream end.

14 Claims, 2 Drawing Sheets 22
16
14
30
12
24
26
32
10
18
20

CATALYTIC VESSEL

FIELD OF THE INVENTION

This invention relates to catalytic vessels, more particularly to reaction vessels for containing metal catalysts for converting automotive emissions.

BACKGROUND OF THE INVENTION

There has long been a need to employ catalysts in reactions such as simultaneous combustion leading to oxidation of carbon monoxide and unburned hydrocarbons, and the reduction of nitrogen oxides (NOx) which are emitted from automotive engines and the like. The role of catalysts, particularly three-way catalysts, in automotive emission control has been widely studied in the art. For example, Taylor, "Automobile Catalytic Converter", *Catalysis, Science and Technology, pp.* 119-67 (Anderson et al. eds. 1984), describes emissions control technology, composition of three-way catalysts, and catalytic supports.

Conventional systems for converting automotive exhaust gases employ pre-fabricated supported catalysts, typically a solid stratum of catalytic material, such as honeycombed ceramic structures, which are placed in the exhaust section of the automobile. As the emissions pass through the solid, the catalytic metal present on the strata aids in conversion of CO, NOx and unburned hydrocarbons to $CO_2$, $N_2$ and $H_2O$. However, the solid strata-type catalytic converter eventually becomes spent, and requires removal and replacement in the exhaust portion of the engine. Moreover, structures such as a honeycomb support are complex and relatively expensive to manufacture. State of the art systems capable of carrying out three-way catalysis include those having supported rhodium and platinum, with noble metals such as rhodium being a preferred catalyst for the reaction:

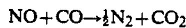

$$NO+CO \rightarrow \frac{1}{2}N_2+CO_2$$

Platinum is the preferred catalyst for the oxidation of CO and unburned hydrocarbons.

The noble metals are expensive and in limited supply, particularly rhodium. This is exacerbated by the fact that current usage of platinum and rhodium in three-way catalysis exceeds the Rh/Pt mine ratio. Thus, reduction of noble metal usage is a problem of three-way catalysis. Therefore, it is necessary to develop alternative approaches to emission control.

Accordingly, there is a need for alternative catalytic vessels capable of converting automotive emissions not utilizing conventional additional, non-regenerable solid catalytic material-containing supports in the exhaust system of an automobile. There is likewise a need for alternative catalytic vessels containing metal catalysts which convert emissions with increased efficiency in order to decrease the required supply of catalyst.

OBJECTS AND SUMMARY OF THE INVENTION

In light of the foregoing, it is an object of the invention to provide a catalytic vessel capable of converting emissions from automotive engines.

It is a further object of the invention to provide a catalytic vessel capable of converting automotive emissions without the need for an additional, non-regenerable solid catalytic support system in the exhaust portion of a engine.

These and other objects of the invention are accomplished by a catalytic vessel comprising an inlet at an upstream end, a plurality of catalytic chambers located downstream of the conduit, wherein at least two chambers are connected by a plate having one or more orifices therein to permit gas flow through from the first chamber to the second chamber, and wherein at least one surface in the chamber is adapted for deposition of a metal selected from the group consisting of platinum, rhodium, and rhenium, and an outlet at its downstream end.

DETAILED DESCRIPTION OF THE PREFERRED EMBODIMENTS

Figure 1:
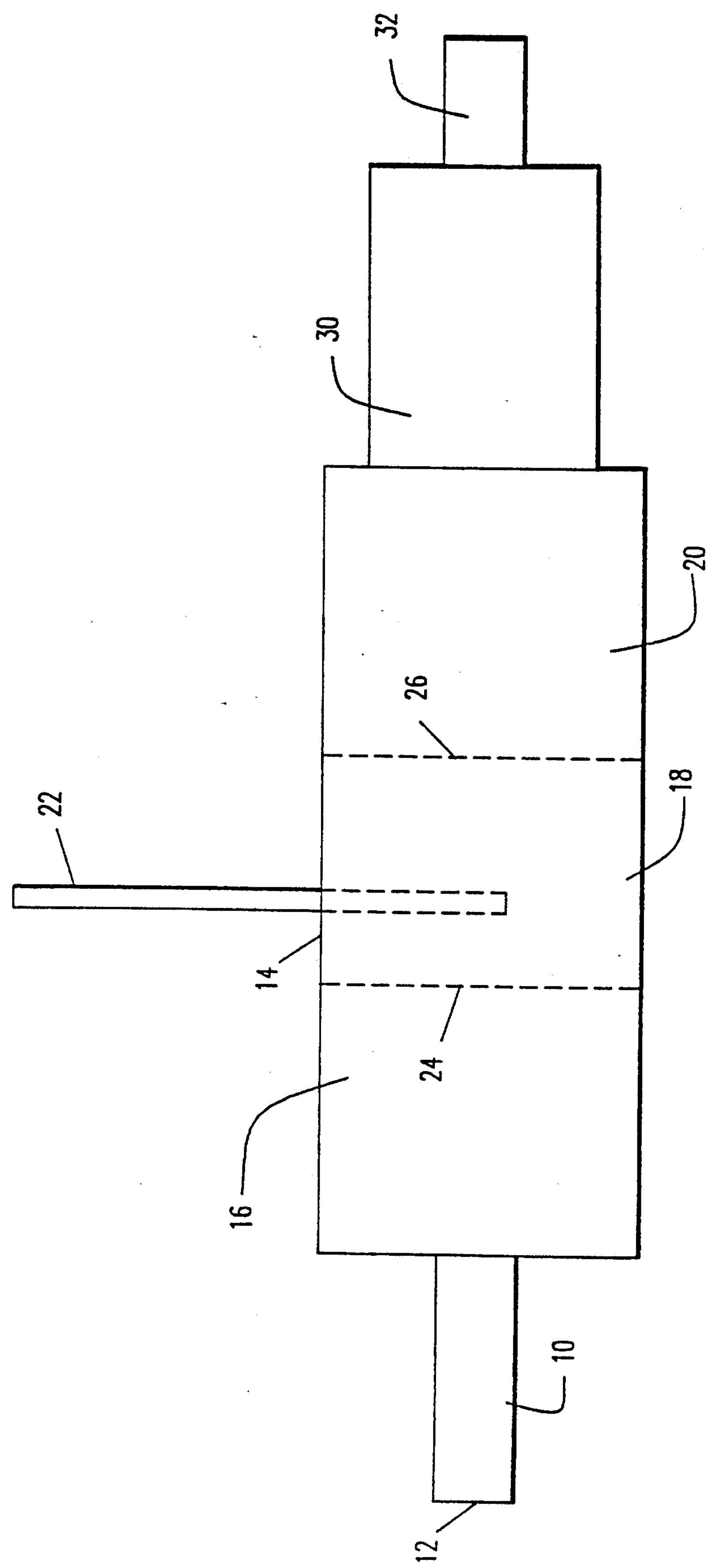
FIG. 1 is a cross-sectional side view of a catalytic vessel of the invention.

The catalytic vessels of the present invention comprise a catalytic vessel comprising an inlet at an upstream end, a plurality of catalytic chambers located downstream of the conduit, wherein at least two chambers are connected by a plate having one or more orifices therein to permit gas flow through from the first chamber to the second chamber, and wherein at least one surface in the chamber is adapted for deposition of a metal selected from the group consisting of platinum, rhodium, and rhenium, and an outlet at its downstream end. The vessels are useful in a catalytic system which contains a liquid source of metal catalyst, means for adding metal catalyst to a combustion system, the catalyst vessel, which collects the metal catalyst and is a site for conversion of starting materials such as automotive emissions to final products.

The catalyst collector is located downstream of the combustion chamber. The collector receives the catalyst and serves as a reaction vessel for conversion of automotive emissions to $CO_2$, $N_2$, and $H_2O$. The catalyst collector contains a surface capable of retaining the catalyst and making the catalyst sufficiently available for reaction with automotive emissions which flow past the collector.

Preferably, the collector is a muffler or muffler-like system having a series of trays and/or baffles and/or a packed bed, with the inclusion of a packed bed particularly preferred. The surface of the muffler should allow the catalyst to be retained in the collector sufficiently to convert emissions passing through the collector. It is preferred that the muffler surface either be made from a solid material having a structure capable of retaining the metals from the catalytic solution, or contain cracks or pores on its surface capable of retaining the metal. Suitable muffler surface materials can include steel, iron, ceramics, and thermosetting polymers, with low carbon steel being particularly preferred. Low carbon steel refers to steel having a carbon content less than about 0.5 percent by weight.

In a particularly preferred embodiment, the muffler further contains a packing material capable of retaining the metal catalyst. It has been found that iron and iron compounds, as well as steels, particularly low carbon steel, in the form of shavings, are especially useful in the practice of the invention. Other suitable packing include ceramics, thermosetting polymers, and other porous materials whose pores are capable of retaining the metal catalyst. Where low carbon steel shavings are employed, they preferably are acid washed and packed into the muffler. The acid wash preferably is with a 1M solution of HCl. As the metal catalyst is carried into the muffler, the catalyst is deposited in the pores of the steel. Emissions passing through the muffler from the combustion chamber can then contact the catalyst and be converted to $N_2$, $CO_2$ and $H_2O$. CO and unburned hydrocarbons are oxidized and NOx is reduced on the metal sites. After conversion, the products are desorbed, making the site available for further conversion. The catalysis reaction preferably is a three-way catalysis: oxidizing CO, oxidizing unburned hydrocarbons, and reducing NOx. Optionally, an additional oxidation catalyst can be employed to increase the conversion of CO and unburned hydrocarbons emitted from the combustion chamber.

In another embodiment, secondary air can be added to the catalyst collector to promote oxidation of CO and unburned hydrocarbons, instead of or in addition to use of the optional oxidation catalyst. Where employed, secondary air is added to comprise about 1 to 15 volumetric percent of the gas flow through the muffler. Preferably about 2 to 4 percent secondary air is utilized.

Referring to FIG. 1, there is shown a catalytic vessel of the present invention. The vessel contains an inlet conduit 10, which preferably is adapted for connection at its upstream end 12 to a combustion system of an automotive engine. Conduit 10 is connected at its downstream end to collection vessel 14. Collection vessel 14 contains three distinct chambers, 16, 18, 20, respectively. First chamber 16 preferably contains low carbon steel shavings, and is primarily a site of reduction of NOx. Second chamber 18 serves as a mixing enhancer of secondary air from a secondary air inlet line 22 and the exhaust gases passing through first chamber 16. Third chamber 20 contains low carbon steel shavings, and is primarily a site of oxidation of CO and unburned hydrocarbons. Addition of secondary air from inlet line 22 serves to promote oxidation in third chamber 20.

Figure 2:
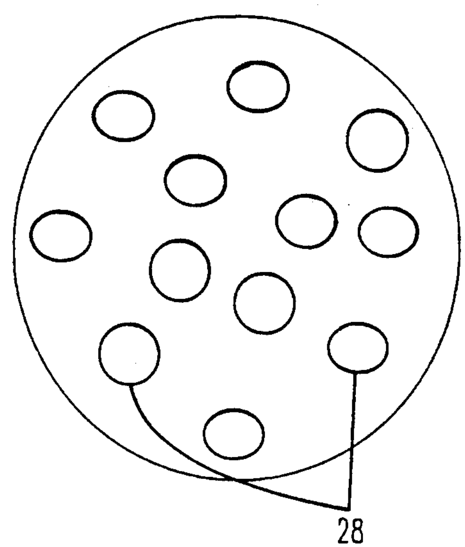
FIG. 2 is a cross-sectional view of a plate useful in a catalytic vessel of the invention.

The three chambers of vessel 14 are separated by perforated plates 24, 26. Plates 24, 26 preferably are made from the same material as the packing material incorporated into each of first, second and third chambers 16, 18, 20. Referring to FIG. 2, there is shown a plate suitable for use in separatinq the chambers of vessel 14. As can be seen in FIG. 2, the plate contains a plurality of orifices 28. The orifices may be randomly positioned in the plate, or may assume any desired pattern. The orifices can be of any suitable shape, with round or elliptical orifices preferred. The number and size of the orifices can be varied, so long as the total orifice area on the plate is sufficient to permit a suitable volumetric flow rate to the adjacent downstream chamber. The total orifice area must be small enough to retain the packing in its appropriate chamber, while providing low resistance and back pressure through the system.

Referring again to FIG. 1, inlet line 22 preferably is made from steel, and is connected to an air source such as a belt-driven air compressor. Inlet line 22 preferably is adapted to deliver sufficient amounts of air to provide up to about 15 percent of the volumetric flow into third chamber 20. It is particularly preferred that inlet line 22 provide about 2 to 4 percent of the volumetric flow into third chamber 20. Secondary air inlet 22 provides excess air to vessel 14 to aid in the oxidation reactions, particularly in carbon monoxide oxidation to $CO_2$.

It is preferred that each of chambers 16, 18 and 20 contain a packing material, such as low carbon steel in the form of shavings. For a typical automotive system, where low carbon steel is employed as the packing, about 0.1 to 5 pounds of packing material are preferred in each chamber. Preferably, each chamber contains about 0.2 to 1 pound of low carbon steel packing.

It is preferred that the packing material be prepared by a process including (a) washing the material with an organic solvent, such as an alcohol, (b) cleansing the material of the organic solvent by water or other suitable cleansing agent, then (c) washing with an alkali compound, (d) cleansing with water or another suitable cleansing agent, then (e) acid washing the packing, and (f) cleansing with water or another suitable cleansing agent. It has been found that an acid wash using hydrochloric acid provides a particularly effective packing. A 1M HCl solution is especially preferred for the acid wash step.

The packing preferably is located in chambers 16, 18, 20 on an internal skeletal structure to provide for satisfactory packing distribution throughout chambers 16, 18, 20. Where no internal structure is provided in the chambers, settling of the packing may result in a breakthrough flow of gas at the top of the chamber, where an insufficient conversion of the exhaust gases will occur.

The skeletal structure preferably comprises a plurality of grids located horizontally across the chamber, and portioned in parallel relations to each other. The packing will then rest on each of the grids, providing exhaust gas conversion substantially throughout the chambers 16, 18, and 20. The packing preferably has the optimal density necessary to provide the desired degree of exhaust gas conversion, without creating excessive back pressure through the chamber. Lower density packed chambers may yield inadequate conversion of gases, while a highly densely packed chamber undesirably increases the back pressure through the chamber. A preferred packing density for each of chambers 16, 18, 20 is about 0.5 to 150 lbs/ft$^3$. It has been found that a packing density of about 10–15 lbs/ft$^3$ is particularly suitable.

An oxidation catalyst structure 30 is located downstream of third chamber 20. Oxidation structure 30 preferably contains an oxidation catalyst, such as iron, steel, copper, or compounds thereof such as iron or copper oxides, with copper oxides being particularly preferred. The oxidation catalyst of structure 30 preferably is formed into a thin sheet which is rolled tightly and then positioned into structure 30. An exit conduit 32 is located at the downstream end of oxidation structure 30. Exit conduit 32 leads to the egress of the system, such as to atmosphere.

In operation, vessel 14 serves as a catalytic collection and reaction site. Two co-pending applications, U.S. Ser. Nos. 841,356 and 841,357, each filed Feb. 25, 1992, describe more fully a catalyst solution which can be the source for the metal catalyst, and a catalytic system which can incorporate the catalytic vessel of the present invention. The disclosure of these two applications is incorporated herein by reference. It is preferred that the catalyst originate from a liquid catalyst solution containing one or more metal compounds in a suitable solvent. Metals useful in the present invention include middle transition metals, particularly Group VIIA metals such as rhenium, and ending transition metals, such as Group VIIIA metals including platinum and rhodium. The metals are present in compound forms such as chlorides, carbonyls, perrhenates, and oxides in the solution. Preferred solvents for the metal compounds include glycol derivatives, and in particular diethylene glycol derivatives such as diglyme [$CH_3O(CH_2)_2O(CH_2)_2OCH_3$], triglyme and tetraglyme. Other preferred solvents include alkyl pyrrolidones such as N-methyl pyrrolidone and alkoxy ethyl ethers such as bis-[2-[2-methoxy-ethoxy]ethyl] ether. Diglyme is a particularly preferred solvent. In the most preferred embodiment, the solution contains $H_2PtCl_6.6H_2O$, $LiReO_4$ and $RhCl_3.4H_2O$ in diglyme.

The solution is introduced into the catalytic system, such as by pumping or atomization, which introduces small drops of solution. The metal catalyst in the solution is carried through the system, preferably by the air intake of the automotive engine through the combustion chamber to inlet conduit 12. The metal catalyst is carried from conduit 12 into vessel 14, where it can be deposited on a surface such as the walls of chambers 16, 18, 20, or the packing material present in these chambers. The metal catalyst can then serve as a reaction site for emissions from the combustion chamber which enter vessel 14 through inlet conduit 12.

While not wishing to be bound by theory, it is believed that the metal catalyst is chemisorbed on the surface, and is dispersed so that a large amount of precious metal surface available for reaction is obtained. It is believed that significantly more metal catalyst atoms are available for reaction in the system of the invention than in conventional catalytic converters.

Once the catalyst is chemisorbed on a surface in vessel 14, it is believed that a conventional three-way catalysis of emissions occurs. That is, unburned hydrocarbons are oxidized, CO is oxidized, and NOx is reduced to $H_2O$, $CO_2$ and $N_2$. Among unburned hydrocarbons it is believed that olefinic, other unsaturated, and cyclic hydrocarbons are oxidized preferentially, with saturated hydrocarbons, and methane in particular, oxidized less preferentially. It is believed that unburned hydrocarbons are generally oxidized preferentially with respect to CO present in the emissions. After oxidation and reduction are carried out, the $H_2O$, $CO_2$ and $N_2$ products are desorbed, and the site is available for further reaction. The catalyst present in vessel 14 can be periodically replenished by injection of additional catalytic feed solution into the system.

It is believed that three-way catalysis occurs substantially throughout vessel 14 from the inlet at conduit 12 to the outlet at oxidation structure 30. However, it has been found that a proportionally greater amount of reduction takes place nearest to the inlet of vessel 14, while a proportionally greater amount of oxidation takes place nearest to the outlet of vessel 14. That is, first chamber 16 is the site of a greater amount of the overall reduction process, while third chamber 20 is the site of a greater amount of the overall oxidation process in vessel 14.

In first chamber 16, the chemical reactions believed to dominate are:

$$NO+CO+HC+O_2 \rightarrow N_2+CO_2+H_2O$$

$$NO+CO+O_2 \rightarrow N_2+CO_2,$$

wherein HC represents unburned hydrocarbons.

In third chamber 20, the chemical reactions believed to dominate are:

$$HC+O_2 \rightarrow CO_2+H_2O$$

$$C+O_2 \rightarrow CO$$

$$CO+O_2 \rightarrow CO_2$$

As the emissions pass through the outlet of vessel 14, they are transported through oxidation catalytic structure 30. Oxidation structure 30 serves to increase the oxidation efficiency of the system by oxidizing CO and unburned hydrocarbons which pass through vessel 14 unreacted. The emissions, now largely free of CO, NOx and unburned hydrocarbons, pass out exit conduit 32, such as to the atmosphere.

Use of a catalytic system of the present invention has been shown to permit operation of an automotive engine in a leaner regime, thereby increasing fuel economy. Conventional automotive engines adapted to convert emissions sufficiently to meet current United States pollutant level requirements of conversion of 76% NOx, 94% CO and 94% unburned hydrocarbons must operate at an air number of about 0.90 to 1.03 (with an air number of 1.0 equivalent to a stoichiometric air:fuel ratio of 14.7:1 by weight). With catalytic systems of the present invention, the engine can be operated at air numbers above 1.10 and still meet pollutant level requirements.

What is claimed is:

1. A catalyst vessel constructed and arranged for three-way catalysis of emissions from a combustion chamber comprising a vessel means having means for receipt of catalyst from a catalyst source an inlet conduit at an upstream end thereof a plurality of catalytic chambers located downstream of the inlet conduit, and an outlet at a downstream end thereof, wherein at least two of the chambers are connected by a plate having one or more orifices therein to permit gas flow from the first connected chamber to the second connected chamber, and wherein a surface in at least one of the first and second connected chambers is constructed and arranged for deposition from the gas phase during conversion of combustion chamber emissions of at least one three-way metal catalyst introduced through the inlet conduit and being selected from the group consisting of platinum, rhodium and rhenium.

2. A vessel according to claim 1, wherein the surface constructed and arranged for metal deposition comprises a packing material located in at least one of the chambers.

3. A vessel according to claim 2 wherein the packing material is selected from the group consisting of steel, iron, ceramics, and thermosetting polymers.

4. A vessel according to claim 3 wherein the packing material is low carbon steel.

5. A vessel according to claim 1 further comprising an inlet conduit for secondary air located between the vessel inlet and the vessel outlet.

6. A vessel according to claim 5 wherein the secondary air inlet conduit is located downstream of at least one chamber and upstream of at least one chamber.

7. A vessel according to claim 6 wherein the secondary air inlet conduit is constructed and arranged to provide up to about 15 percent of the volumetric flow downstream of the secondary air inlet.

8. A vessel according to claim 6 wherein the secondary air inlet conduit is constructed and arranged to provide about 2 to 4 percent of the volumetric flow downstream of the secondary air inlet.

9. A vessel according to claim 1 further comprising an oxidation catalyst source containing an oxidation catalyst and located adjacent to the outlet.

10. A vessel according to claim 9 wherein the oxidation catalyst is selected from the group consisting of iron, copper, and oxides thereof.

11. A catalyst vessel constructed and arranged for three-way catalysis of emissions from a combustion chamber comprising:

(a) vessel means having;

(b) an inlet conduit at an upstream end of the vessel;

(c) a first catalytic chamber located downstream of the inlet conduit;

(d) a second catalytic chamber located downstream of the first chamber;

(e) a plate located between the first and second chambers, the plate having at least one orifice therein to permit gas flow from the first chamber to the second chamber;

(f) means for receiving by deposition from the gas phase during conversion of combustion chamber emissions at least one three-way metal catalyst selected from the group consisting of platinum, rhodium and rhenium introduced through the inlet conduit into the first chamber;

(g) means for receiving by deposition from the exhaust gas stream during conversion of combustion chamber emissions at least one three-way metal catalyst selected from the group consisting of platinum, rhodium and rhenium introduced through the inlet conduit into the second chamber; and (h) an outlet at a downstream end of the vessel.

12. A method of making a catalyst vessel constructed and arranged for three-way catalysis of emissions from a combustion chamber comprising:

providing a catalyst vessel means;

forming a plurality of catalytic chambers within the catalyst vessel means wherein at least two of the chambers are connected by a plate having one or more orifices therein to permit gas flow from the first connected chamber to the second connected chamber;

forming an inlet conduit at an upstream end of the chambers;

forming an outlet at a downstream end of the chambers;

introducing at least one three-way metal catalyst selected from the group consisting of platinum, rhodium and rhenium through the inlet conduit into the chambers during conversion of combustion chamber emissions; and depositing the three-way metal catalysts from the exhaust gases onto a surface of the catalytic chambers.

13. A method of making a catalyst vessel according to claim 12, wherein three-way metal catalysts are continuously deposited in the chambers during conversion of combustion chamber emissions.

14. A method of making a catalyst vessel according to claim 12, wherein three-way metal catalysts are periodically deposited in the chambers during conversion of combustion chamber emissions.

* * * * *